(12) United States Patent
Murray et al.

(10) Patent No.: US 6,829,442 B2
(45) Date of Patent: Dec. 7, 2004

(54) HIGH SPEED OPTICAL RECEIVER

(75) Inventors: James T. Murray, Tucson, AZ (US); William Austin, Tucson, AZ (US)

(73) Assignee: Lite Cycles, Inc., Tusson, AZ (US)

( * ) Notice: Subject to any disclaimer, the term of this patent is extended or adjusted under 35 U.S.C. 154(b) by 597 days.

(21) Appl. No.: 09/740,425

(22) Filed: Dec. 19, 2000

(65) Prior Publication Data

US 2004/0190915 A1 Sep. 30, 2004

(51) Int. Cl.[7] .............................................. H04B 10/06
(52) U.S. Cl. ........................ 398/212; 398/202; 398/131
(58) Field of Search ........................ 398/88, 202, 131, 398/212; 385/43, 34, 93

(56) References Cited

U.S. PATENT DOCUMENTS

| | | | | |
|---|---|---|---|---|
| 4,989,972 A | * | 2/1991 | Braun | ........................ 356/225 |
| 5,192,863 A | * | 3/1993 | Kavehrad et al. | ....... 250/227.24 |
| 5,408,563 A | * | 4/1995 | Beland et al. | ............... 385/125 |
| 5,416,325 A | * | 5/1995 | Buontempo et al. | ... 250/339.08 |
| 5,629,996 A | * | 5/1997 | Rizkin et al. | .................. 385/31 |
| 5,726,440 A | * | 3/1998 | Kalkhoran et al. | ....... 250/214.1 |
| 5,963,790 A | * | 10/1999 | Matsuno et al. | ............... 438/72 |
| 5,971,551 A | * | 10/1999 | Winston et al. | ............. 359/868 |
| 6,348,684 B1 | * | 2/2002 | Nykolak et al. | ............. 250/216 |
| 6,542,307 B2 | * | 4/2003 | Gleckman et al. | .......... 359/638 |
| 6,639,733 B2 | * | 10/2003 | Minano et al. | ............. 359/728 |

* cited by examiner

*Primary Examiner*—M. R. Sedighian
*Assistant Examiner*—Nathan Curs
(74) *Attorney, Agent, or Firm*—Howard R. Popper (57) ABSTRACT

A high speed optical receiver comprises, in combination, a non-imaging light gathering device for directing light from its entrance pupil to its exit pupil according to the edge ray principle and a photonic detector coupled to the exit pupil and having an anti-reflective micro-structured active surface area dimensioned to minimize capacitance effects commensurate with achieving a desired signaling speed.

10 Claims, 4 Drawing Sheets

HIGH SPEED OPTICAL RECEIVER

FIELD OF THE INVENTION

This invention relates to optical coupling arrangements and, more particularly, to optical coupling arrangements suitable for use in high bandwidth, free-space optical communications systems operating at terra-Hertz (THz) signaling rates.

BACKGROUND OF THE INVENTION

High-bandwidth transmitters and receivers (e.g., >1 GHz) for signaling at rates above 650 MHz present a twofold challenge. First, stray capacitance must be minimized, which dictates that solid state detectors have a very small active area, e.g., an aperture of less than 25–30 µm in diameter. This presents a significant challenge in receiver design since optical signals must be gathered, aligned with, and coupled into a very small aperture of the solid-state detector surface with minimal loss.

At the outset, it would seem to be quite straight forward to use a lens (or mirror) to focus a light beam down to any desired spot size. To minimize the size of the receiver it would be desirable to use a lens with a short focal length and to gather the largest column of incident light, it would be desirable to use a lens with the largest possible entrance pupil. This dictates that a lens with a small "f" number (the ratio of focal length to diameter of the entrance pupil) should be used. Because lens aberrations, atmospheric turbulence, misalignment, and manufacturing errors all cause the focused spotsize to be much larger than the diffraction-limited size, use of a smaller "f" number than that dictated solely by diffraction effects seems unavoidable. On the other hand, lenses with small "f" number are quite expensive and difficult to manufacture.

In our co-pending patent application entitled "High Speed Optical Receiver", Ser. No. 09/702252, filed Oct. 30, 2000, the substance of which is hereby incorporated by reference, we described a method of increasing the effective area of a high-speed detector by affixing a non-imaging concentrator element to the face of the high-speed detector. In particular, a compound parabolic concentrator (CPC) was used to channel light from a large entrance aperture to the necessarily smaller exit aperture near the detector face. A somewhat similar approach is disclosed by Ruben Mohedano, Juan C. Minano, Pablo Banitez, Jose, L. Alvarez, Maikel Hernandez, Juan C. Gonzalez, Kazutoshi Hirohashi, and Satoru Toguchi, in an article entitled "Ultracompact non-imaging devices for optical wireless communications" Opt. Eng. 39(10), pp. 2740–2747, (October 2000).

The aforementioned application and journal article did not discuss the role of rays exiting the CPC at extreme angles, e.g., approaching 90° to its optical axis. Although the concentration ratio achieved by the CPC would appear to approach the ideal limit for such rays, such rays would be parallel to the detector surface and could neither be absorbed nor detected. Moreover, light striking the detector surface at or near grazing incidence would simply be reflected at the detector surface and would also not be detected. Because a significant distribution of light rays exit the CPC aperture at angles approaching 90°, the detection efficiency of the CPC/detector combination is less than might be expected.

One approach to increasing the detection efficiency of the CPC/detector combination might lie in providing an antireflective (AR) coating on the surface of the detector so that rays approaching grazing incidence would not be reflected. While we do not reject this approach, as a rule-of-thumb, the best available AR coating materials have a cut-off angle of about 30° to 40°, depending on the substrate material, and their use would not result in the achievement of maximum detection efficiency. It would be extremely advantageous to be able improve the coupling efficiency of the CPC/detector combination to permit the detection of rays incident upon the detector at and beyond the grazing angle of the uncoated detector surface.

SUMMARY OF THE INVENTION

In accordance with an aspect of the present invention, the coupling efficiency of a CPC/detector is increased by treating the surface of the detector so that incident light can be detected at or near the maximum angle of light gathered by the CPC. The detector surface is treated so that it presents an aperiodically distributed array of microscopic silicon spikes, each spike having a quasi-conical aspect. In one embodiment, the spikes exhibit conic angles of approximately 20° on average, so that the overall "blaze angle" of the micro-structured detector surface is such that light is channeled into rather than out of the detector surface. When provided with such a micro-structured surface, nearly all of the incident light at nearly any angle of incidence are absorbed into the detector. The micro-structured surface may be effected by bombardment of the silicon substrate of the detector with high-intensity ultrafast laser pulses. Alternatively, the micro-structured surface can be formed on n-type (arsenic doped) silicon, independent of dopant concentration so that the micro-structured surface may be generated on the first layer of a semiconductor optical detector diode. Furthermore, the microstructures may, with equally advantageous results, be formed on silicon having other dopants (e.g., p-type), and even on other semiconductor materials that may be desired in the front layers of high-speed optical detectors selected for use with non-imaging light gathering concentrators.

BRIEF DESCRIPTION OF THE DRAWING

The foregoing and other objects of the present invention will become more apparent when the following detailed description is read together with the drawing, in which.

GENERAL DESCRIPTION

Figure 1:
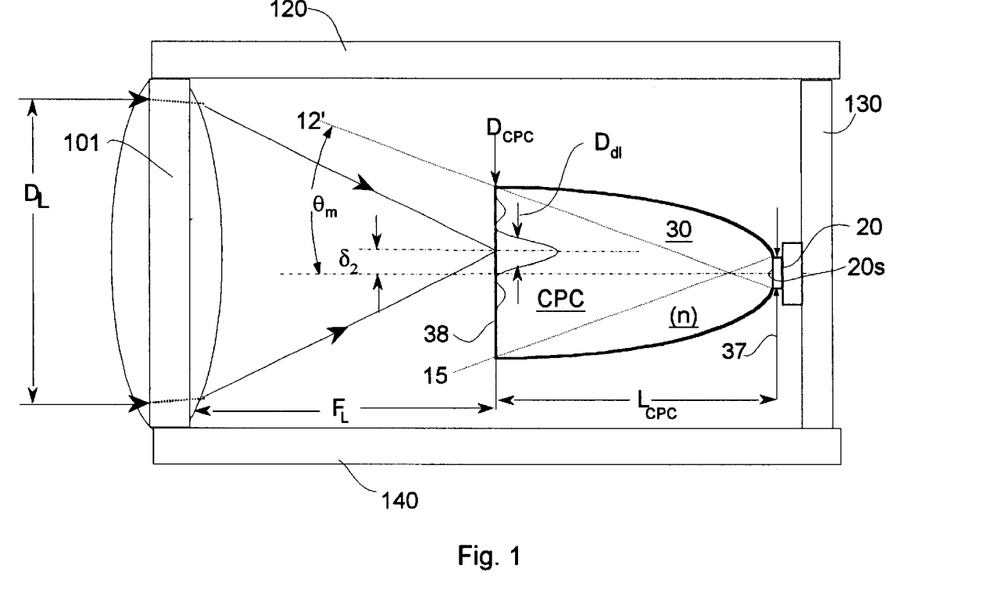
FIG. 1 is a schematic diagram of a non-imaging light gathering concentrator in combination with a photonic detector having its surface treated in accordance with the invention.

FIG. 1 shows a high-speed receiver that utilizes a non-imaging light gathering concentrator 30, illustratively, a dielectric-filled compound parabolic concentrator (CPC), for delivering light to the active aperture area of detector 20. The light, assumed to come from a distant (e.g., >1 km) source (not shown), is first focused by lens 401 to a spot $D_{dl}$ in its focal plane that lies at the entrance $D_{cpc}$ of concentrator 30. The minimum size of spot $D_{dl}$ that can be focused by lens 401 is determined by the diffraction limit, given by:

$$D_{dl} = 2.44 \lambda F_\#, \qquad (1)$$

where $\lambda$ is the wavelength of the received light, and $$F_\# = \frac{F_L}{D_L} \qquad (2)$$

is the f-number of the lens, given by the ratio of the focal length $F_L$ to lens diameter $D_L$.

Ideally, all the light that is gathered by lens 101 should be directed to the active aperture surface 20s of detector 20, where it would be absorbed and converted into an electronic signal. In order to achieve maximum signaling speed, the spotsize $D_{dl}$ of the light focused by lens 101 should be as small as possible, e.g., significantly smaller than the input aperture size $D_{CPC}$ CPC 30. Aberrations induced by lens 101, as well as atmospheric turbulence, misalignment, and manufacturing errors, will cause the actual focused spotsize to be much larger than the diffraction-limited spotsize. Therefore, the design rule for the compound parabolic concentrator should be $$D_{CPC} \gg D_{DL} \qquad (3)$$

In order to avoid the use of surface coatings on CPC 30 it is desirable that the CPC convey all light from its entrance pupil, surface 38, to its exit aperture 37 (at the surface of detector 20) by total internal reflection (TIR). The maximum angle allowed for light incident at entrance pupil 38 which will preserve TIR is $\sin(\theta) \leq n - 2/n$, where n is the refractive index of the CPC material. This condition, therefore, limits the useful numerical aperture of the collection lens 101, given by $NA = \sin(\theta_{max}) \sim = 1/(2 F_\#)$, for the TIR condition to hold in the CPC. This, in turn, limits the collection lens F number ($F_\#$) to the following expression:

$$F_\# \geq \left[2\left(n - \frac{2}{n}\right)\right]^{-1} \qquad (4)$$

Under this condition, the diameter of the CPC entrance pupil 38 is related to that of its exit pupil 37, which is assumed to be the diameter $D_{det}$ of the active area of detector 20, by the following relationship:

$$D_{CPC} = 2n \, F_\# D_{det} \qquad (5)$$

Likewise, the length $L_{CPC}$ of concentrator 30 is related to the $F_\#$ of the lens 101 and the diameter $D_{det}$ of detector 20 by $$L_{CPC} = D_{det}(1 + 2n \, F_\#) F_\# \qquad (6)$$

These simple equations are all that is required to completely describe the parameters of an ideal high-speed receiver.

In the FIG. 1 embodiment, the detector 20 can be aligned with the exit pupil of CPC 30 using an optical bench (not shown). However because the maximum cone angle ($2 \times \theta_m$) of CPC 30 embraces an area at the entrance pupil 38 that is much larger than the aperture of detector 20 the requirements on focusing lens 101 are much relaxed. For example, the center of focus of lens 101 may deviate from the centerline of mounting structures 120, 130, and 140, and the centerline of the aperture of detector 20 by more than the amount $\delta_2$, and still all of the incident light will be directed to the CPC exit pupil 37 at detector 20 aperture. Of course, frame members 120, 130, and 140 must maintain the alignment of lens 101, CPC 30 and detector 20 with sufficient dimensional stability under varying conditions of temperature and vibration, but the choice is less stringent than with prior art lens assembly methods.

In the ideal limit, the spread in ray angles at the exit pupil 37 of a 3D concentrator should span an entire hemisphere from $\theta'=0$ to $\pi/2$. However, under normal circumstances, rays exiting concentrator pupil 37 at large angles (e.g., $\theta'>60°$) will not couple into detector 20 due to the high Fresnel reflectivity loss at large angles, especially for light polarized in a plane perpendicular to the plane of incidence ("$\sigma$" or "s" polarization). As an added complication, rays at exit pupil 37 of a concentrator made from solid dielectric material having angles that are beyond the critical angle, will be back-reflected by total internal reflection, and, therefore, will not enter the detector. The critical angle at the interface between the exit pupil of a concentrator of index $n_s$, and an outside medium with index $n_o$ is given by $$\theta_c = \sin^{-1}\left(\frac{n_o}{n_s}\right), \qquad (7)$$

which is usually quite small. For example, $\theta_C = 40°$ for an interface between BaK1 ($n_s = 1.555$) and air ($n_o = 1.0003$). In this example, more than half the light entering a concentrator element will not enter the detector. Therefore, it is essential to improve the coupling (hereinafter referred to as the transmission factor) from the concentrator exit pupil into detector 20 at high angles of incidence.

Photonic detectors for use above 10 GHz are typically made from semiconductor structures configured as either Schottky or p-i-n diodes. Schottky-barrier photodiodes are formed from metal-semiconductor heterojunctions, and are most useful for applications in the visible or near-ultraviolet spectral region where the photon energy is well above the bandgap energy of the semiconductor material. The preferable carrier wavelength for light used in high-speed free-space communications transceivers falls in the eye-safe spectral region between 1.4 and 2.0 $\mu$m. Photodiodes made with p-i-n structures can be designed to operate very efficiently and at very high speeds in the eye-safe spectral region. Therefore, p-i-n photodiode structures are most appropriate for our application.

Photodiodes made from p-i-n structures are fabricated by sandwiching a layer of i-type (intrinsic undoped) semiconductor material between layers of p-type (hole rich) and n-type (electron rich) semiconductors. Reverse biasing induces a large electric field throughout a depletion region that extends over the width of the intrinsic layer (or layers). The material used for the intrinsic layer is chosen (or designed) to absorb light in the spectral region of interest. Light absorbed in the intrinsic layer is converted to electron-hole pairs, which act as charge transport agents called photogenerated carriers. The electrons and holes split and migrate towards the n-and p-layers, respectively, which serve as contact layers for the detector circuit. Light detection is realized by measuring the voltage drop across a resister that passes current produced by photogenerated carriers. It is preferable to have as large of an illumination area as possible to easy the coupling of light onto the detector. As pointed out previously, however, the detector geometry should be configured in such a way that minimizes the junction capacitance to enhance its speed (bandwidth). The geometry that best fits both these requirements is one where the light enters perpendicular to the p-i-n layer structure through the p-contact layer and into the absorbing intrinsic layer (light can also transmit through the n-contact layer). Because the junction capacitance is proportional to the area of the junction, the shape of the detector face should be a disk, which has the minimum area to size ratio. As such, the p-contact material should be transparent at the wavelength of the incident light, and the electrical contact should encircle the p-layer in the form of a ring electrode.

The advantage of the p-i-n diodes is that the intrinsic layer can be relatively thick, thus increasing the light absorption efficiency and decreasing the junction capacitance, which is essential for high-speed operation. The disadvantage of the using thick intrinsic layers is that the transit time of the photogenerated carriers increases with the layer thickness, directly affecting the speed of the detector. Electron transport velocities in the intrinsic medium are up to an order-of-magnitude higher than hole transport velocities. (Hence, the preference of illuminating through the p-contact layer where the holes migrate.) Therefore, one method of minimizing the effective carrier transport time while maintaining low junction capacitance is to implement a dual-depletion p-i-n structure (c.f., A. M. Joshi and X. Wang, "DC to 50 GHz Wide Bandwidth InGaAs Photodiodes and Photoreceivers," Proc. SPIE 1999, CR73, p. 181). In these structures, two layers of material form the intrinsic region: The top layer, located under the p-contact, is thin and highly absorbing, and the bottom layer, located above the n-contact, is thick and transparent. The slow-moving holes generated in the thin absorbing layer have a shorter distance to travel to intercept p-contact than do the fast-moving electrons, which flow towards the n-contact. This design strategy minimizes the carrier transport time without compromising the thickness, and hence capacitance, of the intrinsic layers.

The quantum efficiency, $\eta$, of the photodiode is the probability that a single incident photon (light particle) will generate an electron-hole pair that contributes to the detector current. The performance of a high-speed optical transceiver is therefore directly related to the quantum efficiency of the detector. The quantum efficiency of a p-i-n photodiode is given by $$\eta = T_s \zeta [1 - e^{\alpha d}] \quad (8)$$

where $T_s$ is the ratio of light power transmitted through the detector surface and into the absorbing intrinsic layer, over the light power incident the detector face; $\zeta$ is the fraction of electron-hole pairs that successfully avoid recombination and contribute to photocurrent; and, $1-\exp[-\alpha\ d]$ is the fraction of absorbed light entering the intrinsic layers, where a is the absorption coefficient of the intrinsic absorbing layer, and d is the layer thickness.

The recombination factor, $\zeta$, is predominantly a function of the material growth since recombination events are triggered by defects and impurities. The absorption efficiency is a function the product between the absorption efficiency, $\alpha$, and the absorbing intrinsic layer depth, d. The hole transport time, which must be minimized to enhance the speed of the detector, is essentially proportional to the absorbing intrinsic layer depth, d. Therefore, it is preferable to use utilize an intrinsic absorbing layer with as high an $\alpha$ value as possible. This can be done by designing the admixture of ternary or quaternary compounds, such as $In_{1-x}Ga_xAs$ or $(In_{1-x}Ga_x)(As_{1-y}P_y)$, respectively, to tune the bandgap energy. Given, $\alpha$, the minimum layer thickness, $d_{min}$, is then set to a value that ensures sufficiently high absorption efficiency. For example, an absorption efficiency of >99% is achieved when $\alpha\ d>5$, which can be used to set $d_{min}$.

The transmission factor, $T_s$, is dependent on two factors: The transparency of the p-contact layer and the reflection loss at its surface. Obviously, the p-contact layer material should be chosen to be highly transparent at the wavelength of interest. Since the p-contact material is necessarily a semiconductor, high transparency is achieved by selecting high bandgap materials; that is, materials with bandgap energies that are far above the photon energy at the optical signal wavelength. Candidate p-contact materials are Si, InP, GaAs, and GaP, which have cut-off wavelengths of 1.15, 0.92, 0.87, and 0.55-$\mu$m, respectively. These materials have very large refractive indices (n≈3.5). Therefore, the surface reflection loss can be quite severe for untreated surfaces; especially at large angles. If we assume that the transparency of the p-contact layer material is sufficiently high, the expression for transmission factor in the quantum efficiency, $T_s$, is given by $$T_s = \int_0^{\pi/2} T_s(\theta) \sin 2\theta d\theta \quad (9)$$

where $T_s(\theta)$ is the surface transmission as a function of the angle of incidence, $\theta$. Novel strategies are presented hereinafter to optimize $T_s(\theta)$ over the entire hemisphere of the concentrator/detector surface interface for both hollow and solid concentrator elements.

Hollow Concentrator Elements

High-speed photodetector 20 may advantageously be butted directly up against the exit aperture of a hollow (air-filled) concentrator element 30. The p-contact layer of detector materials with sufficiently large bandgap energy in the eyesafe spectral region have an index of refraction, $n_s$≈3.5, which is significantly larger than the index of air, $n_o$=1.0003. Consequently, an untreated detector surface would have a Fresnel reflection loss of >30% for all angles of incidence of unpolarized light. The Fresnel reflection loss significantly impacts the transmission factor, $T_s$, lowering the potential detector quantum efficiency. Large angular bandwidth antireflection strategies must therefore be exercised.

We have considered three approaches to increase the air-to-detector interface transmission over the full hemisphere of incident angles. The first approach would be to coat the semiconductor surface with one or more thin film layers to lower the interface reflectivity. The second approach is to simulate an inhomogeneous graded index antireflection layer by imposing a sub-wavelength relief structure to the surface of the detector. The last approach we consider is a novel microstructure (super-wavelength) detector surface that traps light rays of all angles, redirecting them into the intrinsic absorption layer of the detector at near-normal incidence.

Antireflection Coating

It is appreciated that thin-film layers of low-index dielectrics can be applied to high-index semiconductors to improve their transmission (c.f., H. A. Macleod, Thin-Film Optical Filters, $2^{nd}$ ed., (McGraw-Hill, New York, 1989), pp. 72–92). We have designed a one- and three-layer quarter-wave antireflection (AR) coating to illustrate the improvements afforded by relief structure techniques.

The normal incidence transmission of a single-layer coated substrate is ideal when the coating is one quarter-wavelength thick (i.e., $d_f=\lambda/4$, where $\lambda=\lambda_o/n_f$ is the design wavelength in a film with refractive index $n_f$), and the film refractive index is $$n_f=\sqrt{n_o n_s} \quad (10)$$

where $n_s$ and $n_o$ are the refractive indices of the substrate and outside medium, respectively. For the case considered here, the outside medium is air ($n_o=1.0$), and the detector surface index is that of the p-contact layer ($n_s=3.5$). Therefore, the preferred thin-film layer material will have a refractive index of $n_f=1.87$, which is close to the index of common thin-film materials (e.g., SiO and $La_2O_3$). The transmission is ideal (100%) at only the design wavelength and at normal incidence. For high-speed free-space optical communications applications, the carrier wavelength bandwidth is much smaller than the transmission bandwidth of the AR coating, so no special considerations need to be exercised in improving the wavelength acceptance of the coating. Therefore, we are concerned with only the angular transmission properties, specifically $T_s(\theta)$ and $T_s$, of the coating as compared to the bare and micro-structured surface. It is well known that the bandwidth of a thin-film AR coating on high-index substrates is improved by adding more quarterwave layers with gradually higher index. The design rules for multi-layer AR coatings are similar to the single-layer rule in Eq. (7), and are summarized below:

$$n_1^4=n_o^3 n_m$$
$$n_2^4=n_o^2 n_m^2$$
$$n_3^4=n_o n_m^3 \quad (11)$$

Figure 2:
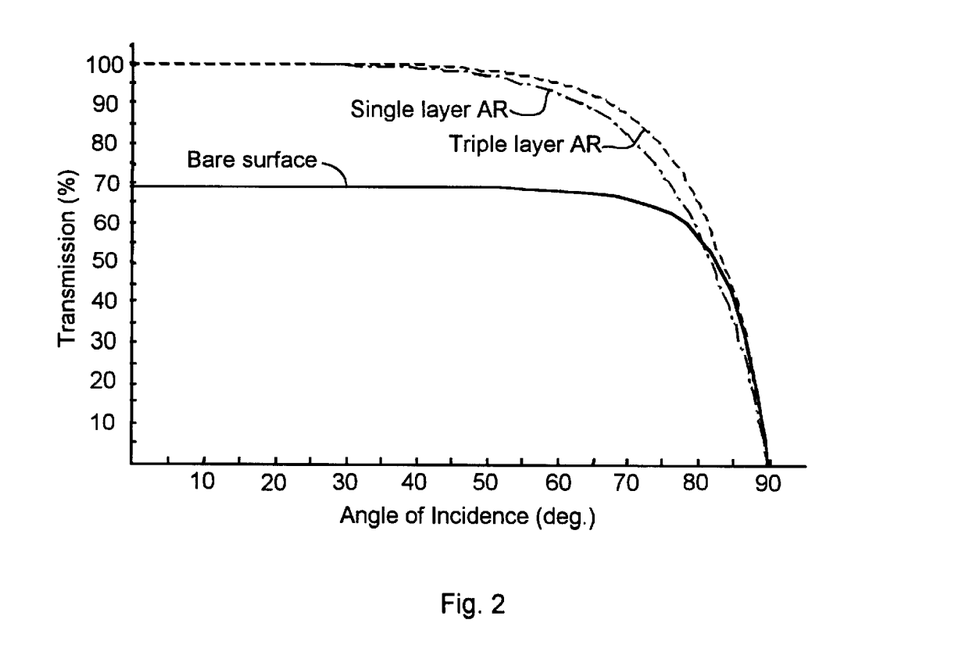
FIG. 2 compares the effects of different detector surface coatings on light transmission for various angles of incidence.

Therefore, the ideal refractive index values for a three-layer quarterwave AR coating are $n_1=1.37$, $n_2=1.87$, and $n_3=2.56$, which are closely achieved using MgF, SiO, and ZnSe, respectively. FIG. 2 shows per-cent transmission versus angle, $T_s(\theta)$, for a single-(dash-dot) and triple-layer (dashed) quarterwave AR coating design on a $n_s=3.5$ semiconductor substrate-to-air interface. The bare surface transmission curve is shown as the solid line.

The detector quantum efficiency transmission factor for the bare, single-, and triple-layer AR surfaces shown in FIG. 2 are 67.6%, 93.2%, and 94.8%, respectively. Although the AR coatings vastly improve the transmission, they still are unable to significantly pass light at near grazing incidence, i.e., at $\theta>70°$. The calculated transmission factors also assume uniform angular illumination, which is clearly not always true. The detector quantum efficiency transmission factor will obviously decrease for illumination distributions that favor higher angles of incidence. One such case occurs when the transceiver objective lens in misaligned with the optical axis of the concentrator, or the distant source transceiver is misaligned with the local transceiver. Therefore, it is essential to further improve the high-incidence angle transmission of the detector face.

Sub-Wavelength Antireflection Surface-Relief Gratings

One strategy of increasing the bandwidth antireflection between two unlike materials is to form a layer with continually varying (non-homogeneous) index profile. Ideally, the range of the index variation matches the index difference between the two unlike media. Inhomogeneous layers with smoothly varying refractive index profiles are perfect antireflective coatings for all wavelengths shorter than twice the optical thickness of the coating. Similarly, for a single wavelength, the coating is ideal for all angles in which the effective optical path length at an angle is twice the wavelength. Therefore, high angular acceptance AR coatings can be realized by forming a thick (several wavelengths) non-homogeneous layer on the substrate, which ideally has a refractive index variation that spans the difference between the two unlike materials (e.g., air and semiconductor).

It is difficult, if not impossible, to fabricate a thick graded index coating that spans the full range of index values from air ($n_o=1$) to the detector surface index ($n_s=3.5$), so non-homogeneous coatings have not enjoyed wide acceptance. A clever alternative method of creating an effective medium with a continuously graded index profile has been borrowed from nature (P. B. Clapham and M. C. Hutley, "Reduction of lens reflection by the 'moth eye' principle," Nature (London) 244, pp. 281–282 (1973)). Moth eyes have sub-wavelength grating type surface structures that cannot be resolved by light. Consequently, the optical properties experienced by the incident light are determined by the spatially averaged optical properties of the structured material and the air-filled voids; thus, creating an effective graded index layer that spans the entire range of refractive indices. If the surface relief structure thickness, d, is sufficiently large (e.g., $d>2\lambda_o$), very large antireflection bandwidths are observed.

Several investigators have recognized the elegance and simplicity of nature's antireflection strategy and have devised theoretical models and manufacturing techniques to produce antireflection structures (ARS) on substrate materials (c.f., D. H. Raguin and G. M. Morris, "Analysis of antireflection-structured surfaces with continuous one-dimensional surface profiles," Appl. Opt. 32(14), pp. 2582–98 (1993) and references therein). The patent to Gaylord, et al., U.S. Pat. No. 5,007,708, discloses methods for calculating and manufacturing ARS using holography, electron beam lithography, reactive ion etching, and other techniques.

We have explored the ARS strategy as a way to increase the angular acceptance of the air/substrate interface. The preferred substrate material is a high-bandgap semiconductor, which serves as both the growth substrate and p-contact layer in a dual-depletion p-i-n photodiode structure (e.g., Si, InP, GaAs, or GaP). These substrate materials all have about the same refractive index of approximately $n_s=3.5$ over the eyesafe wavelength band (1.4 to 2.0 $\mu$m).

Figure 3:
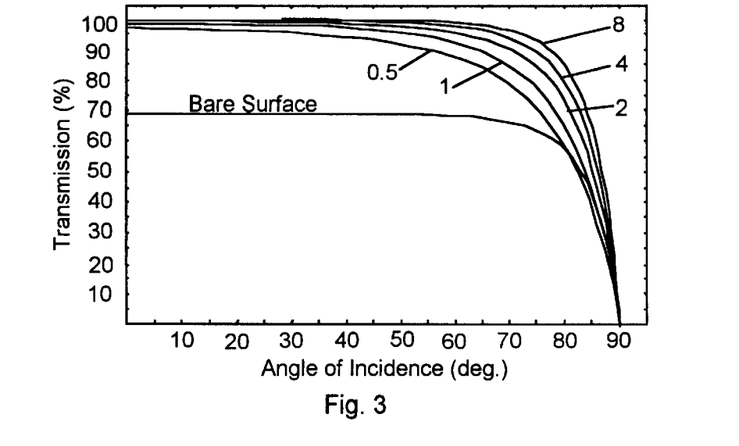
FIG. 3 compares the effect of different sub-wavelength micro-structured surfaces on light transmission.

FIG. 3 shows the calculated transmission curves for a set of triangular grating relief structures formed on a substrate of index 3.5. The five solid curves are for triangular surface structures with surface relief heights $d/\lambda=0.5, 1, 2, 4$, and 8, respectively. The grating spacing of the triangular relief is set to $\Lambda=\lambda/(n_o+n_s)=0.286 \lambda$, which is the maximum allowable value before diffraction orders appear. The quantum efficiency transmission factor for $d/\lambda=0.5, 1, 2, 4$, and 8 are $T_s=88.9, 92.5, 95.2, 96.8$, and 98.0%, respectively. Therefore, ARS structures with $d/\lambda>2$ are required to improve the detector quantum efficiency over that which can be obtained by standard AR coating techniques. The minimum surface relief aspect ratio (given by the ratio of the relief height to grating spacing) that shows an improved quantum efficiency over standard AR coatings is, therefore, $d/\Lambda \geq 7$, which is very difficult, if not impossible, to fabricate using standard techniques (e.g., holography, electron beam lithography, or reactive ion etching). Therefore, a new antireflection strategy is required for easier fabrication.

Micro-Structured Surface Light Traps

We propose a new strategy for achieving light coupling over the entire hemisphere of a hollow concentrator/detector interface. Our strategy relies on trapping light from all angles of incidence with spike-like super-wavelength microstructures on the detector surface. Our novel strategy relies on light trapping rather than antireflection through interference means.

Figure 4A:
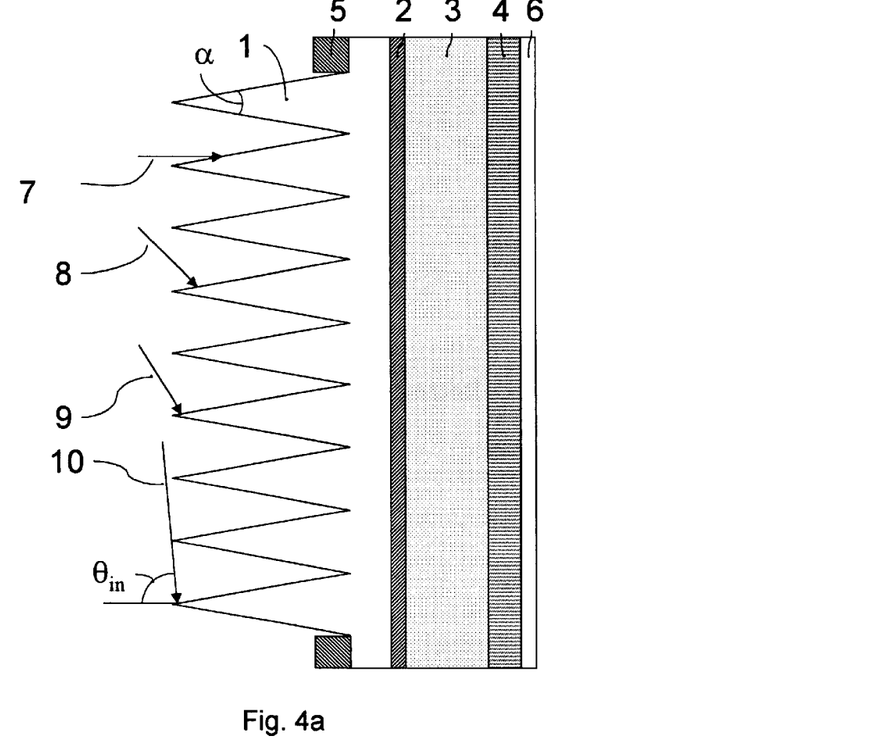
FIG. 4a shows a detector interface having a micro-structured surface for use with a compound parabolic reflector according to the invention.
Figure 4B:
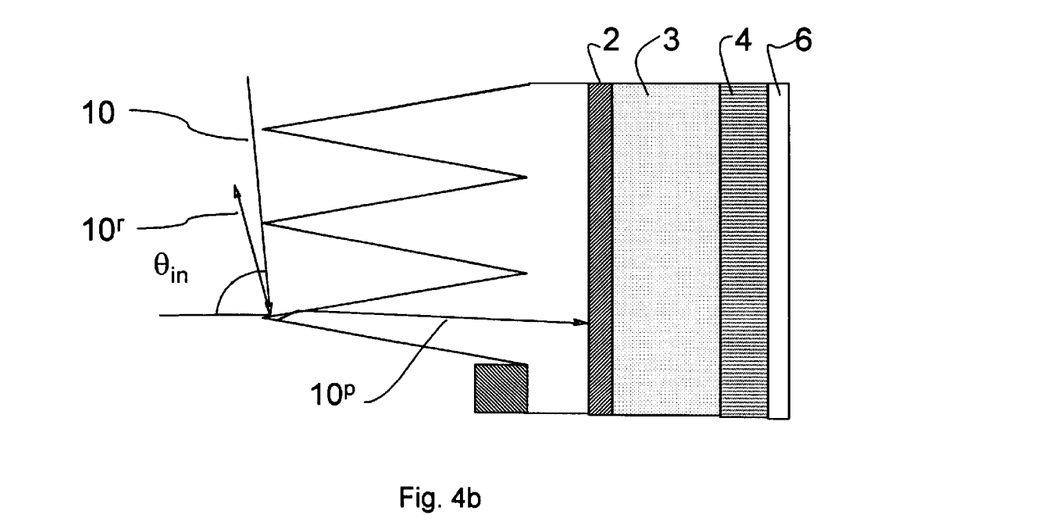
FIG. 4b shows an enlarged view of a portion of the micro-structured surface.

FIG. 4a, and the enlargement view FIG. 4b, show a profile section of a dual-depletion p-i-n photodetector with spike microstructures 1 formed on the p-contact layer substrate. The material comprising the p-contact layer is preferably a p-doped high bandgap semiconductor that is transparent at the carrier wavelength of the incident light field. Preferred materials for the eyesafe wavelength band between 1.4 and 2.0-$\mu$m are Si, InP, GaAs, or GaP, all of which have an approximate refractive index of 3.5. The next adjacent layer 2 is a thin, highly absorbing, intrinsic layer, which is preferably lattice matched to the neighboring layers (e.g., InGaAs). The second intrinsic layer 3 is a thick transparent drift layer used to transport the fast-moving electron carriers to the n-contact layer 4. Electrical contacts 5 and 6 are used to interface the photodiode to the external detector electronics (not shown). The p-contact electrode 5 is preferably a ring electrode, allowing light to be coupled into the p-contact layer 1 without impediment from the electrode. The spikes on the p-contact layer surface have a cone angle $\alpha$, and are formed out of the p-contact material, without breaking the continuity of the layer.

If a ray strikes the internal surface at an angle of incidence that is greater the critical angle (i.e., $\theta_{in}$ arcsin $[n_o/n_s]$) it will undergo total internal reflection (TIR), and all of its energy will be transferred to its reflective offspring. Likewise, since the angle of incidence for each reflected generation within the spike increases by the cone angle, all subsequent generations will spawn only reflective offspring. Hence, rays entering the spikes are likely to be trapped and channeled by TIR down the spike to the absorbing intrinsic layer 2.

The first reflected generation encounters an adjacent spike at an angle of incidence that is diminished by the cone angle, $\alpha$. Consequently; a greater fraction of energy penetrates the spike after each reflective generation since the Fresnel reflection decreases with the angle of incidence. The secondary transmitted offspring are trapped by TIR and channeled down to the absorbing intrinsic layer.

After m=$|(\pi/\alpha+1)/2-\theta_{in}/\alpha|$ bounces, where the quantity enclosed within vertical lines| means 'next highest integer' and $\theta_{in}$ is the parent ray angle with respect to the detector surface normal, the reflected rays turn back towards direction of origin and are rejected by the structure. However, the amount of energy contained in the rejected generations is very small because the ray strength is diminished after each successive generation. The maximum turn-back loss is approximately equivalent to the Fresnel surface reflection loss at normal incidence for the material, $$R_o = \left[\frac{n_o - n_s}{n_o + n_s}\right]^2 \quad (12)$$

which, in the case considered here is 30.8%.

Reflected generations spawn transmitted offspring that become trapped by TIR inside neighboring spikes, and are channeled down the spike to the absorbing intrinsic layer 2. Those rays that do not immediately become trapped in an adjacent spike spawn transmitted rays that subsequently become trapped and channeled in next-to-nearest neighbor spikes. Ray 9 is a larger-angle ray that has a resonant reflection 9 after two reflective generations. The lineage of ray 9 is characteristic of the structure: Offspring are reflected until they become trapped in neighboring spikes, where they are transformed by TIR into nearly normal rays to the absorbing layer interface.

As more clearly shown in the enlarged view, FIG. 4b, a tight ray 10 incident upon spikes 1 at angle $\theta_{in}$ interacts with the surface in the normal way (i.e., according to Fresnel's Law of reflection and refraction). At an air/surface interface the ray is split into a reflected ray, e.g., ray 10$^r$, and a refracted component, such as ray 10$^p$ which enters the active layer 2. Other incident rays such as rays 7, 8 or 9 may undergo additional refractions and/or reflections at other interface(s), where they are again split into reflecting and refracting components, spawning a new generation. Reflected generations spawn transmitted offspring that become trapped by TIR inside neighboring spikes, and are channeled down the spike to the absorbing intrinsic layer 2. Each generation spawns two more offspring until the rays are either rejected or absorbed into layer 2.

Ray 10 is an example of a grazing incidence ray. Grazing incidence rays undergo a single air-to-substrate reflection (first generation). Hence, the net reflective loss for all rays incident the detector at angles $\theta_{in} > (\pi-\alpha)/2$ will be very near to the normal incidence value presented in Eq. (9). The first generation transmitted offspring is trapped by TIR in the spike, and the angle of the internal reflective generations is transformed to a near normal incident ray with respect to the absorbing layer.

We have developed a theoretical model to calculate the effective transmission curves of micro-structured surfaces. Our model utilizes nonsequential polarization raytracing engine to generate the lineage of incident rays. Offspring rays that strike the absorbing layer surface 2 result in a successful transmission event. Transmission curves are generated by tracing the ray lineage of several tens of parent rays per incident angle. The strike position of each parent ray on the structure is generated by randomly sampling of an illumination probability distribution (Monte Carlo), which for our purposes is uniform. The fractional intensity of thousands of absorbed offspring rays is tallied for each parent ray and the angular transmission curves are generated by summing the results.

Figure 5:
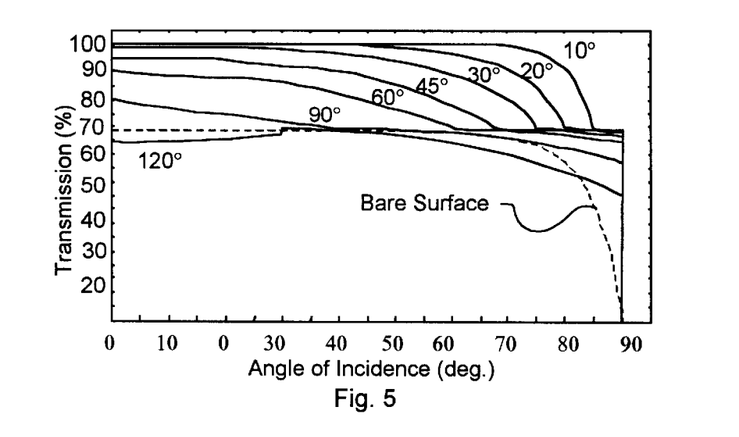
FIG. 5 compares the effect of micro-structured detector surfaces having different cone angles on light transmission.

FIG. 5 shows the resulting unpolarized (average between "s" and "p" polarization) transmission curves obtained for several spike-like microstructure surface types on a substrate with a refractive index of 3.5. Results are reported for seven different spike cone angles $\alpha$, which vary from 10° to 120°. Near ideal transmission is achieved for spike angles $\alpha$<20°. The unique property of the micro-structured spike array is that they capture rays over the entire hemisphere of angles, and the maximum reflection loss is comparable to the normal incident Fresnel reflection loss, given in Eq. (9). The quantum efficiency transmission factor for $\alpha$=120°, 90°, 60°, 30°, 20° and 10° are $T_s$=65.2, 69.8, 78.6, 84.9, 92.0, and 99.1%, respectively. The detector quantum efficiency is markedly improved for small-angle spike microstructures. As stated previously, the quantum efficiency transmission factors are calculated assuming uniformly distributed input field intensity over the full range of angles, which is clearly not always the case. One such case occurs when the transceiver objective lens in misaligned with the optical axis of the concentrator. In this scenario, the illumination distributions favor higher angles of incidence, and the large-angle transmission properties of the spike microstructure array become more important, showing a bigger improvement over standard prior-art antireflection strategies.

A method for producing micro-structured spike arrays on a silicon surface was disclosed by Tsing-Hua Her (Tsing-Hua Her, et al., "Novel conical microstructures created in silicon with femtosecond laser pulses," in Conference on Lasers and Electro-Optics, Vol. 6, 1998 OSA Technical Digest Series (Optical Society of America, Washington D.C., 1998)), the substance of which is hereby incorporated by reference. The investigators report on the spontaneous formation of spike structures on silicon when the substrate is irradiated with 500 laser pulses of 100-fs duration with a pulse energy fluence of 1 J/cm$^2$ in a 500-torr $SF_6$ or $Cl_2$ environment. Spikes are formed with cone angles of approximately α=20°. The average spike separation and height depends on the laser pulse intensity, which they controlled by varying the pulse width. Average spike separations between 5 and 10-μm were achieved for pulse durations of 0.1 and 10 ps, respectively. The central spikes were 40-μm high, with an average separation of 10-μm. The cone angle of the spikes formed on the surface appeared to be invariant with respect to the laser fluence. Moreover, the spike height and separation can be controlled with the laser fluence. More thorough spike morphology is reported in the dissertation by Tsing-Hua Her (Tsing-Hua Her, "Femtochemistry at gas/solid interfaces," Harvard University, Cambridge, Mass., May, 1998).

The investigators also studied the affect of carrier dopants (p and n) on the spike formation and found no significant dependence. Therefore, we can conclude that the p-contact layer of a fast p-i-n photodiode can be formed from p-doped silicon with laser-induces spike microstructures. There is no experimental evidence that laser induced spike microstructures will form on other large bandgap semiconductors (e.g., InP, GaAs, or GaP); however, we can surmise that it may be possible.

Solid Concentrator Elements

We have already discussed the advantages of using solid concentrator elements in our above-mentioned patent application. Here we will discuss the importance of properly designing the interface between solid concentrator elements and the attached detector.

Figure 6:
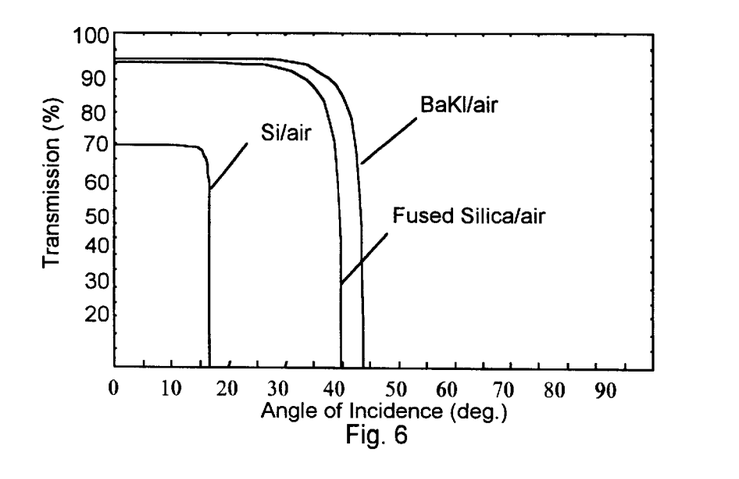
FIG. 6 compares the effect of solid concentrators fabricated of different materials on light transmission.

Light rays incident the exit aperture of a solid concentrator at angles greater than the critical angle, $θ_c=\arcsin[n_o/n_s]$, will undergo total internal reflection (TIR), greatly diminishing the effective quantum efficiency transmission factor. FIG. 6 shows the transmission curves for the solid/air interface at the exit aperture for solid concentrators made out of Si, fused silica, and BaK1 glass, when the concentrator is interfaced with air.

Figure 7:
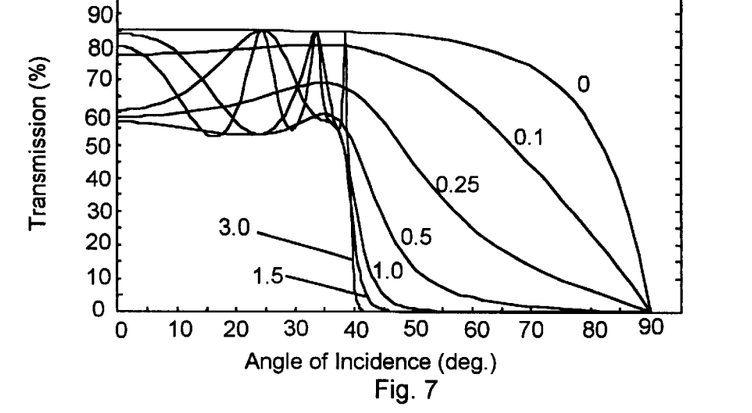
FIG. 7 compares the effect of air-gap distance between the concentrator and detector surface on light transmission.

The transmission bandwidth improves when the detector surface is sufficiently close to the exit aperture to frustrate the TIR. However, the detector quantum efficiency transmission factor is strongly dependent on the quality of the concentrator/detector interface contact. Air caught between the two surfaces causes interference, which lowers the transmission performance at large angles. FIG. 7 shows the angular transmission curves, $T_s(θ)$, as a function of the air-gap separation distance between the detector surface and the exit aperture of a solid concentrator. In the calculation, the detector surface and concentrator element have refractive indices of 3.5 and 1.555, respectively, at the eyesafe wavelength of 1.54-μm. The effective detector quantum efficiency transmission factor has a strong dependence on the air-gap separation. The transmission factors for the curves shown vary from 80.8 to 26.4%, for air-gap separations from 0.0 to 3.0-μm, respectively, which illustrates the importance of eliminating air gaps and bubbles from the detector/concentrator interface.

Figure 8:
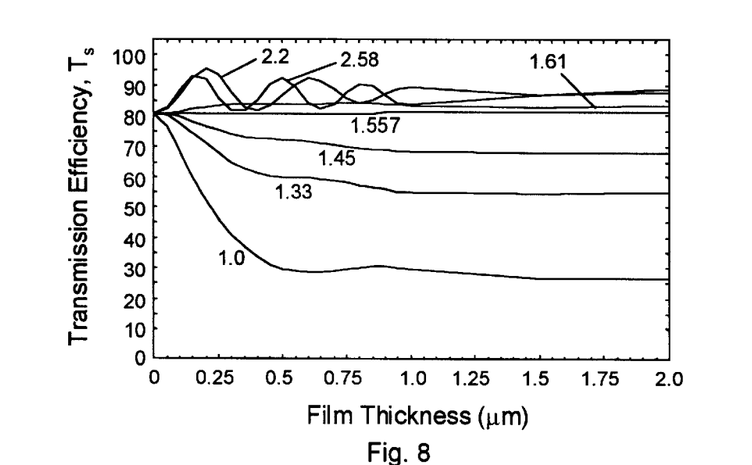
FIG. 8 shows the effect on transmission efficiency of the intervening film layer thickness and FIG. 9 shows a non-imaging concentrator having a hyperbolic cross-section.

We have recognized that the detector quantum efficiency transmission factor for a solid concentrator/detector combination can be greatly enhances by filling the void between the concentrator and detector with a suitable dielectric medium. FIG. 8 shows the effective quantum efficiency transmission factor as a function of the film thickness of several candidate intervening media. The materials corresponding the refractive indices in FIG. 6 are air (1.0), water (1.33), UV14-3 epoxy (1.45), UV10 epoxy (1.557), EP42HT epoxy (1.61), ZnS (2.2), and ZnSe (2.58). The transmission factor, $T_s$, improves dramatically when medium to high index (n>1.5) media are used as intervening layers. Furthermore, the sensitivity of the transmission factor with film thickness is much less severe for medium to high index intervening layers. The UV curing epoxy UV10 is commercially available from Master Bond, Inc. 154 Hobart St., Hackensack, N.J. 07601, and is particularly suited for this application, since the detector-to-concentrator bond can be set after the alignment is optimized by irradiating the interface with UV light, which, conveniently can be delivered through the concentrator. Further improvements in the transmission factor are realized by adjusting the film thickness, which is particularly evident in the high-index ZnS and ZnSe curves, where distinct interference ripples appear in the transmission curves. The maxima in the transmission factors occur near the quarterwave thickness of the films; however, not precisely. Therefore, our calculation procedure is essential for determining the optimum film design for high index films.

Figure 9:
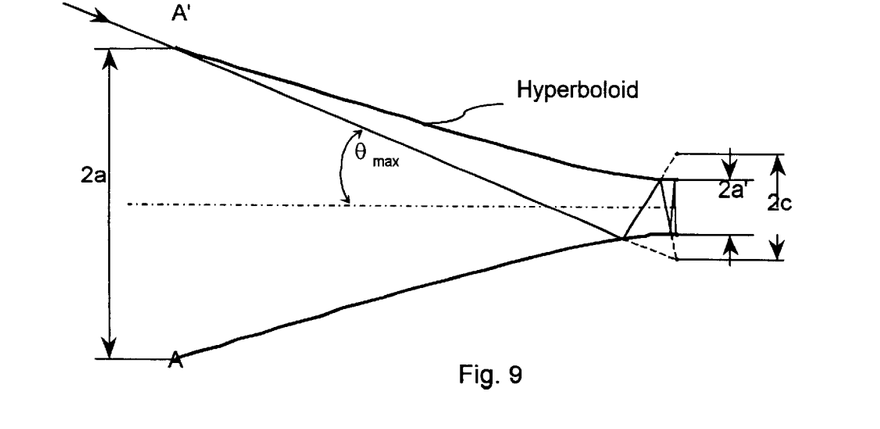

It should be appreciated that alternative concentrator geometries to the CPC may be employed with equally advantageous results, as shown in FIG. 9 which illustrates a non-imaging concentrator having a hyperbolic cross-section. In fact, any concentrator geometry that obeys the edge ray principle will achieve near-ideal concentration ratios. The CPC geometry achieves the theoretical concentration limit in one plane (i.e., 2D), and near-ideal concentration ratios in the rotationally symmetric 3D geometry. There are several advantages of the CPC, inter alia, solid CPC geometry can be configured to channel all the incident light through total internal reflection (TIR), without the need for external reflective coating on the surfaces of the CPC. CPC configurations can be drawn and molded from the ends of large core commercially available optical fibers that can be doped with Erbium and used as optical preamplifiers. However, one drawback of the CPC geometry is that is does not achieve the theoretical 3D concentration limit. A non-imaging concentrator geometry that does achieve the theoretical 3D concentration limit is flow line concentrator, or "FLC" (c.f., R. Winston and W. T. Welford, "Geometrical vector flux and some new non-imaging concentrators," J. Opt. Soc. Am. 69(4), pp. 532–536 (1979)).

What has been described is deemed to be illustrative of the principles of our invention. Further and other modifications may be made by those skilled in the art without, however, departing from the spirit and scope of the invention

What is claimed is:

1. A high speed optical receiver comprising:
   a photonic detector having its active aperture area dimensioned to minimize capacitance effects at a particular wavelength, said active aperture area having a super-wavelength micro-structured, anti-reflective non-layered surface having cone-like projections having a height greater than said particular wavelength; and
   a non-imaging light gathering reflector having an entrance pupil and an exit pupil, said reflector conveying light from said entrance pupil to said exit pupil according to the edge ray principle, said exit pupil being coupled to said micro-structured surface of said active aperture area, said microstructured surface capturing substantially the entire hemisphere of light exiting said exit pupil of said non-imaging gathering reflector.

2. A high-speed optical receiver according to claim 1 wherein said exit pupil is in contact with said micro-structured surface of said detector.

3. A high-speed optical receiver comprising:
a photonic detector having its active aperture area dimensioned to minimize capacitance effects at a particular wavelength, said active aperture area having a micro-structured, non-layered anti-reflective surface; and
a non-imaging light gathering reflector having an entrance pupil and an exit pupil, said reflector conveying light from said entrance pupil to said exit pupil according to the edge ray principle, said exit pupil being coupled to said micro-structured surface of said active aperture area; wherein said non-imaging reflector is defined by a parabolic arc rotated about a rotational axis oriented to the arc's parabolic axis at an angle substantially equal to half the maximum conical angle of incident light to be gathered, said arc being radially displaced from said rotational axis at one end by the radius of said entrance pupil and at the other end by the radius of said exit pupil, the ratio of the squares of the diameters of said entrance and exit pupils being substantially $$\frac{n^2}{\sin^2\theta_{max}},$$

where, n is the index of refraction of the concentrator element; and $\theta_{max}$ is half the maximum cone angle of incident light.

4. A high-speed optical receiver according to claim 3 further comprising an imaging device for focusing light on said entrance pupil of said non-imaging light gathering reflector.

5. A high-speed optical receiver according to claim 4 wherein said reflector is a solid dielectric element.

6. An optical coupler according to claim 5, wherein said imaging device is a lens having an F number given by:

$$F_\# \geq \left[2\left(n - \frac{2}{n}\right)\right]^{-1},$$

where n is the index of refraction of said solid CPC element.

7. A high speed optical receiver comprising, in combination
a compound parabolic reflector having a light gathering entrance pupil and an exit pupil, said reflector conveying light from said entrance to said exit pupil according to the edge ray principle; and
a photonic detector having its active surface treated to exhibit a superwavelength micro-structured non-layered antireflective surface at the wavelengths to be detected, said surface having cone-like projections having an average height greater than said wavelength to be detected, said detector being coupled to said exit pupil of said reflector, said active surface area being dimensioned to minimize capacitance effects at said wavelengths.

8. A high speed optical receiver according to claim 7 further comprising an imaging device for focusing light to a diffraction-limited spotsize on said entrance pupil.

9. A high speed optical receiver according to claim 7 wherein said active surface of said detector is treated to exhibit an aperiodically distributed array of microscopic silicon spikes, each spike having a quasi-conical aspect.

10. A high speed optical receiver according to claim 9 wherein said spikes have conic angles of approximately 20° on average such that light is channeled into rather than out of said detector surface.

* * * * *